(12) United States Patent
Sato et al.

(10) Patent No.: US 10,745,204 B2
(45) Date of Patent: Aug. 18, 2020

(54) CONVEYOR AND CONVEYANCE METHOD

(71) Applicant: Sumitomo Seika Chemicals Co., Ltd., Kako-gun, Hyogo (JP)

(72) Inventors: Ryota Sato, Himeji (JP); Katsuya Fujishiro, Himeji (JP); Kazuo Fujii, Himeji (JP)

(73) Assignee: Sumitomo Seika Chemicals Co., Ltd., Kako-gun, Hyogo (JP)

( * ) Notice: Subject to any disclaimer, the term of this patent is extended or adjusted under 35 U.S.C. 154(b) by 0 days.

(21) Appl. No.: 16/498,265

(22) PCT Filed: Jan. 25, 2018

(86) PCT No.: PCT/JP2018/002271
§ 371 (c)(1),
(2) Date: Sep. 26, 2019

(87) PCT Pub. No.: WO2018/179751
PCT Pub. Date: Oct. 4, 2018

(65) Prior Publication Data
US 2020/0031581 A1   Jan. 30, 2020

(30) Foreign Application Priority Data

Mar. 29, 2017   (JP) ................. 2017-064586

(51) Int. Cl.
*B65G 17/12*   (2006.01)
*B65G 19/14*   (2006.01)
(Continued)

(52) U.S. Cl.
CPC ............. *B65G 17/12* (2013.01); *B65G 19/14* (2013.01); *B65G 19/22* (2013.01); *B65G 23/44* (2013.01); *B65G 53/44* (2013.01); *B65G 2201/04* (2013.01)

(58) Field of Classification Search
CPC ........ B65G 19/14; B65G 19/16; B65G 19/22; B65G 17/12; B65G 17/14; B65G 47/24
(Continued)

(56) References Cited

U.S. PATENT DOCUMENTS 1,995,589 A * 3/1935 De Los Sinden ...... B65G 19/16
198/629
2,089,738 A * 8/1937 Eimer .................... B65G 19/16
198/494

(Continued)

FOREIGN PATENT DOCUMENTS

JP   S60-183414 A   9/1985
JP   S62-124914 A   8/1987
(Continued)

OTHER PUBLICATIONS

International Search Report in International Application No. PCT/JP2018/002271, dated Apr. 17, 2018.
(Continued)

*Primary Examiner* — James R Bidwell
(74) *Attorney, Agent, or Firm* — Knobbe, Martens, Olson & Bear, LLP (57) ABSTRACT

Provided is a conveyor such that, after stopping or restricting supply of granular material to a downstream device, it is possible to restart normal operation of conveying the granular material without delay. This conveyor includes: a casing
(Continued)

having a conveying path of a granular material therein and having a discharge port for discharging the granular material to a downstream device; a plurality of conveying units accommodated in the casing and configured to convey the granular material to the discharge port by circulating along the conveying path; an opening/closing mechanism that opens and closes the discharge port; and a control unit that controls operation of the plurality of conveying units and the opening/closing mechanism. When restricting supply of the granular material to the downstream device, the control unit controls the opening/closing mechanism to close the discharge port, and continues to circulate the plurality of conveying units, thereby continuing to move the granular material along the conveying path.

8 Claims, 4 Drawing Sheets (51) Int. Cl.
*B65G 19/22* (2006.01)
*B65G 23/44* (2006.01)
*B65G 53/44* (2006.01)

(58) Field of Classification Search
USPC .................. 198/716, 720, 725, 728, 801
See application file for complete search history.

(56) References Cited

U.S. PATENT DOCUMENTS

| | | | | |
|---|---|---|---|---|
| 2,147,199 | A * | 2/1939 | Hapman | B65G 19/16 198/716 |
| 2,438,083 | A * | 3/1948 | Whitney | B65G 19/16 198/629 |
| 2,756,866 | A * | 7/1956 | Wilde, Jr. | B65G 19/14 198/629 |
| 4,534,461 | A | 8/1985 | Silverthorn et al. | |
| 5,383,547 | A * | 1/1995 | Noda | B65G 19/16 198/716 |
| 9,975,702 | B2 * | 5/2018 | Bertolini | B65G 19/14 |
| 10,131,500 | B2 * | 11/2018 | Nicholson | C08L 23/08 |
| 2012/0325621 | A1 * | 12/2012 | Koller | B65G 15/44 198/367 |

FOREIGN PATENT DOCUMENTS

| | | |
|---|---|---|
| JP | 1994-42822 | 6/1994 |
| JP | 2001-179203 A | 7/2001 |
| JP | 2004-210531 A | 7/2004 |

OTHER PUBLICATIONS

Written Opinion in International Application No. PCT/JP2018/002271, dated Apr. 17, 2018.

* cited by examiner

CONVEYOR AND CONVEYANCE METHOD

TECHNICAL FIELD

The present invention relates to a conveyor and a conveyance method that convey a granular material.

BACKGROUND ART

Conventionally, in order to convey a granular material, various conveyors such as a flight conveyor are used, for example. A flight conveyor conveys a granular material with flights that move along a conveying path (for example, see Patent Document 1).

CITATION LIST

Patent Literature

Patent Document 1: JP S62-124914U

SUMMARY OF INVENTION

Technical Problem

Normally, a conveyor using flights or the like conveys a granular material supplied from an upstream device (such as a feeder), and discharges this granular material to a downstream device (such as a packaging device). Within this sort of line, there are cases where it is necessary to temporarily restrict supply of the granular material from the conveyor to the downstream device due to excess supply or the like of the granular material, for example. In such a case, if operation of the conveyor is stopped in a state with the granular material remaining within the conveyor, gaps between particles of the granular material become clogged due to the own weight of the granular material, and fluidity of the granular material decreases. The granular material with decreased fluidity serves as resistance against driving force of the flights or the like, and as a result, it becomes difficult to restart operation of the conveyor due to overloading. In such a state, it is necessary to perform a recovery operation to remove the granular material within the conveyor, which may cause a delay in the operation of conveying the granular material.

In order to address the above problems, when temporarily restricting supply of the granular material to the downstream device, it is common to stop operation of the conveyor after the granular material inside of the conveyor is discharged to a downstream buffer. However, due to layout limitations, it is not always possible to install a buffer of a size sufficient to accommodate the granular material inside of the conveyor.

On the other hand, if supply of the granular material to the downstream device is continued without restricting operation of the conveyor, problems are likely to occur in the downstream device such as breakage of equipment due to overflow or overloading, and eventually the operation of conveying the granular material will be delayed.

One object of the present invention is to provide a conveyor and a conveyance method such that, after restricting supply of the granular material to the downstream device, it is possible to restart normal operation of conveying the granular material without delay.

Solution to Problem

A conveyor according to a first aspect of the present invention is a conveyor that conveys a granular material to a downstream device, the conveyor including: a casing having a conveying, path therein and having a discharge port for discharging the granular material to the downstream device; a plurality of conveying units accommodated in the casing and configured to convey the granular material to the discharge port by circulating along the conveying path; an opening/closing mechanism that opens and closes the discharge port; and a control unit that controls operation of the plurality of conveying units and the opening/closing mechanism. When restricting supply of the granular material to the downstream device, the control unit controls the opening/closing mechanism to close the discharge port, and continues to circulate the plurality of conveying units, thereby continuing to move the granular material along the conveying path. Note that restricting supply of the granular material also includes, in addition to stopping supply of the granular material, reducing the amount of the granular material to supply.

A conveyor according to a second aspect of the present invention is the conveyor according to the first aspect, in which when restricting supply of the granular material to the downstream device, the control unit controls the opening/closing mechanism to completely close the discharge port.

A conveyor according to a third aspect of the present invention is the conveyor according to the first aspect or the second aspect, in which the plurality of conveying units are configured to move in a vertical direction in at least part of the conveying path.

A conveyor according to a fourth aspect of the present invention is the conveyor according to any of the first to third aspects, in which each of the plurality of conveying units is a flight.

A conveyance method according to a fifth aspect of the present invention is a conveyance method of conveying a granular material to a downstream device with a conveyor having a discharge port, the conveyance method including following steps (1) to (4).

(1) a step of supplying the granular material to the conveyor (2) a step of conveying the granular material to the discharge port by causing a plurality of conveying units included in the conveyor to circulate along a conveying path (3) a step of discharging the granular material from the conveyor to the downstream device through the discharge port (4) a step of, when restricting supply of the granular material to the downstream device, closing the discharge port, and continuing to circulate the plurality of conveying units, thereby continuing to move the granular material along the conveying path

Advantageous Effects of Invention

According to the present invention, when it becomes necessary to restrict supply of the granular material to the downstream device, the discharge port of the conveyor is closed by the opening/closing mechanism, and circulation of the conveying units is continued. Thus, at least some of the granular material circulates in the conveying path within the conveyor without being discharged from the discharge port, and as a result, fluidity of the granular material that remains within the conveyor is maintained. Therefore, even when restarting normal operation of conveying the granular material, an overload due to resistance of the granular material does not occur. As a result, after restricting supply of the granular material to the downstream device, it is possible to restart normal operation of conveying the granular material without delay.

DESCRIPTION OF EMBODIMENTS

Hereinafter, a conveyor and a conveyance method according to one embodiment of the present invention will be described with reference to the drawings.

1. Overall Configuration of Production Line System

Figure 1:
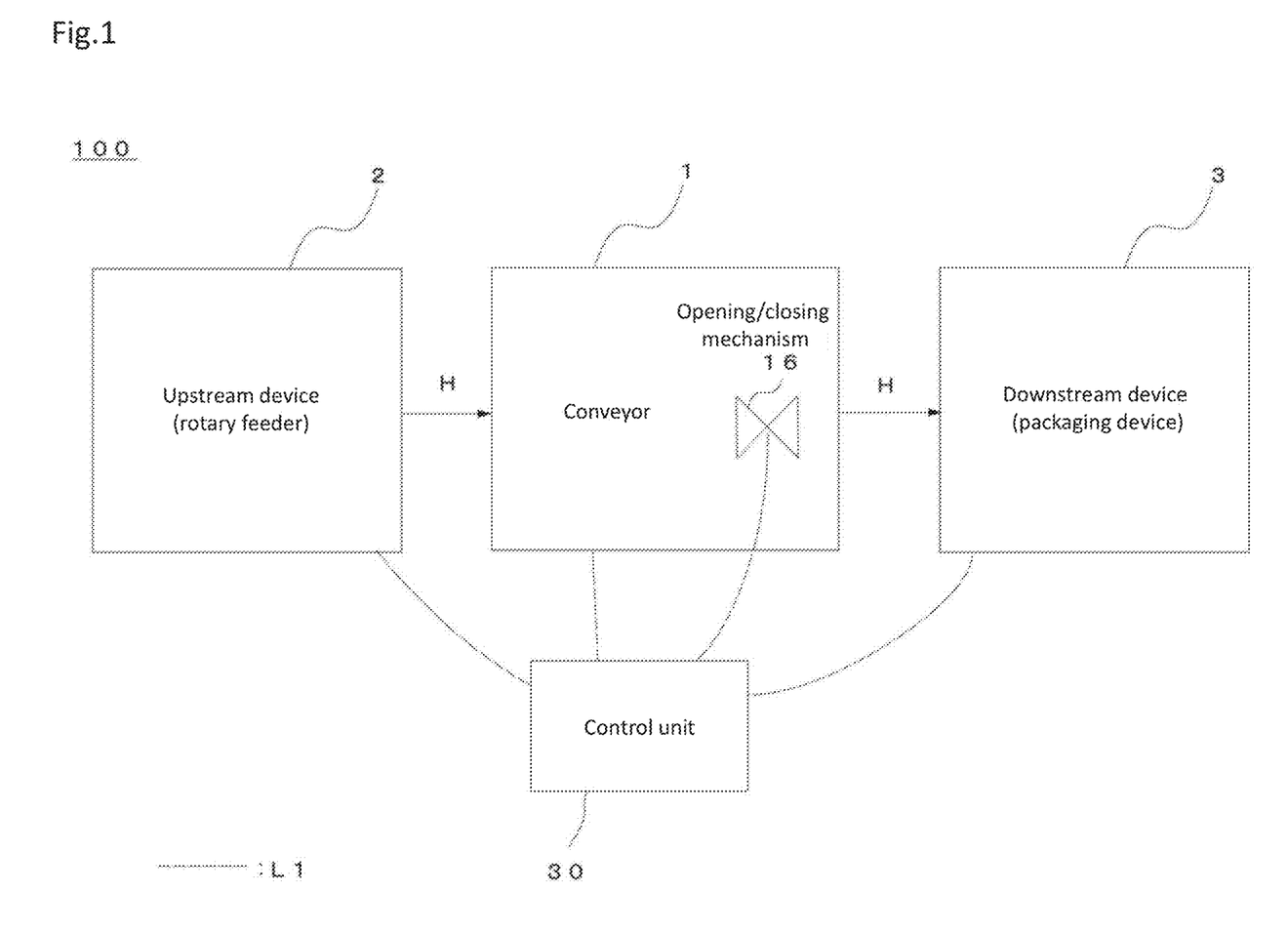
FIG. 1 is a schematic configuration view of a granular material production line system including a conveyor according to an embodiment of the present invention.

FIG. 1 is a schematic configuration view of a production line system 100 including a conveyor 1 according to the present embodiment. The conveyor 1 is a device for conveying a granular material H. As shown in FIG. 1, in addition to the conveyor 1, the production line system 100 is provided with an upstream device 2 that supplies the granular material H to the conveyor 1, and a downstream device 3 to which the conveyor 1 discharges the granular material H. The granular material H is conveyed in order from the upstream device 2 to the conveyor 1, and then from the conveyor 1 to the downstream device 3.

Overall operation of the production line system 100 is controlled by a control unit 30. The control unit 30 is connected through a communications line L1 to the conveyor 1, the upstream device 2, and the downstream device 3, and controls operation of these devices 1 to 3. Thus, the conveyor 1, the upstream device 2 and the downstream device 3 are capable of cooperative processing while conveying the granular material H, and are incorporated in a production line in series.

Figure 2:
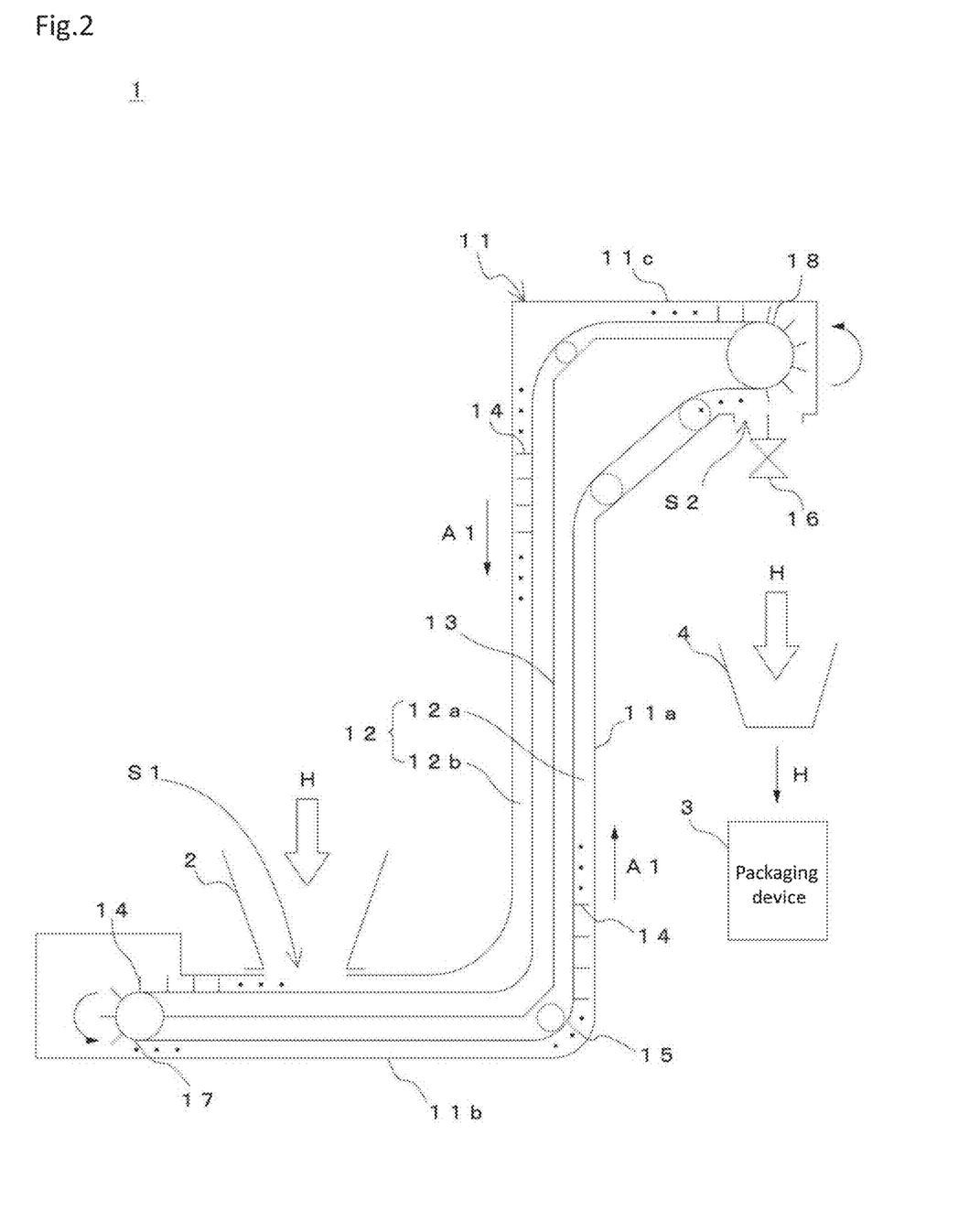
FIG. 2 is a side cross-sectional view showing an internal structure of conveyor according to an embodiment of the present invention.

The types of the upstream device 2 and the downstream device 3 are not particularly limited, but in the present embodiment, a rotary feeder is disposed as the upstream device 2 and a packaging device is disposed as the downstream device 3. The conveyor 1 has a supply port S1 where the granular material H is supplied, and a discharge port S2 for discharging the granular material H, and the rotary feeder continuously or intermittently supplies the granular material H to the supply port S1. Although not shown in FIG. 1, a hopper 4 is disposed between the discharge port S2 of the conveyor 1 and the packaging device. As shown in FIG. 2, the hopper 4 is disposed above the packaging device. The hopper 4 receives the granular material H discharged from the discharge port S2 of the conveyor 1, and afterward functions as a buffer that temporarily stores the granular material H before the granular material H is supplied to the packaging device. The packaging device packages the granular material H supplied from the hopper 4 by a predetermined amount at a time, and then conveys the packaged material to a device disposed at downstream of the packaging device.

Granular material is a generic term for powder and particulate matter. The granular material H according to the present embodiment has fluidity, and also has properties such that even in a stationary state, gaps between particles of the granular material H become clogged due to the own weight of the granular material H, and so the granular material H gathers and becomes dense. Resin particles are an example of the granular material H having such properties. Also, although not limited to the following, in a case where packed bulk density W1 (g/cc), aerated bulk density W2 (g/cc), angle of repose $\alpha(°)$, and compressibility C (%) satisfy the following conditions C1 to C4, the granular material H tends to more remarkably exhibit the above properties. Note that among the following conditions C1 to C4, as more of the conditions are satisfied, it becomes easier for the granular material H to have the above-described properties, but even when at least one of the conditions is satisfied, it is easy for the granular material H to have the above-described properties.

$0.08 \leq W1 \leq 5.2$, more preferably $0.5 \leq W1 \leq 1.2$     C1:

$0.05 \leq W2 \leq 5.0$, more preferably $0.4 \leq W2 \leq 1.1$     C2:

$15 \leq \alpha \leq 70$, more preferably $25 \leq \alpha \leq 45$     C3:

$1 \leq C \leq 65$, more preferably $5 \leq C \leq 25$     C4:

2. Details of Conveyor Configuration

Hereinafter, the configuration of the conveyor 1 will be described in detail with reference to FIG. 2. The conveyor 1 according to the present embodiment is a flight conveyor, and conveys the granular material H so as to lift the granular material H mainly from below to above in the vertical direction.

The conveyor 1 has a casing 11 and a plurality of conveying units (flights 14) accommodated within the casing 11. Within the casing 11, a loop-like conveying path 12 where these flights 14 are conveyed is formed, and the flights 14 convey the granular material H by circulating within the conveying path 12 along a conveying direction A1.

The casing 11 has a center portion 11a extending in the vertical direction, a lower portion 11b extending in the horizontal direction from a lower end portion of the center portion 11a, and an upper portion 11c extending in the horizontal direction from an upper end portion of the center portion 11a. The above-described supply port S1 is formed in the lower portion 11b, and opens vertically upward. Also, the above-described discharge port S2 is formed in the upper portion 11c, and opens vertically downward. The discharge port S2 is located vertically above the supply port S1.

The conveying path 12 includes a forward path 12a from the supply port S1 to the discharge port S2, and a return path 12b from the discharge port S2 to the supply port S1. Within the casing 11, a bottom plate 13 extending along the conveying direction A1 is disposed so as to divide the space within the casing 11 into two, and the forward path 12a and the return path 12b are defined by the bottom plate 13 and an inner wall of the casing 11. The flights 14 conveyed in the forward path 12a advance while bending from the lower portion 11b of the casing 11 to the center portion 11a, and from the center portion 11a to the upper portion 11c. Conversely, the flights 14 conveyed in the return path 12b advance while bending from the upper portion 11c of the casing 11 to the center portion 11a and from the center portion 11a to the lower portion 11b. The granular material H is introduced into the supply port S1 from the upstream device 2, and afterward moves while being pushed by the flights 14 advancing through the forward path 12a, reaches the discharge port S2, and is discharged from the discharge port S2.

The plurality of flights 14 each have the same shape, and are disposed at equal intervals along the conveying direction A1. Each flight 14 is flat, and its main face (widest face) is orthogonal to the conveying direction A1. Also, each flight 14 stands orthogonal to the bottom plate 13 as well.

Each flight 14 is fixed between two endless chains 15 that circulate along both ends of the bottom plate 13. A sprocket 17 is accommodated within the lower portion 11*b* of the casing 11, and a sprocket 18 is accommodated within the upper portion 11*c*. The endless chains 15 are wound around these sprockets 17 and 18, and the conveying direction A1 of the flights 14 fixed to the endless chains 15 is reversed at the sprockets 17 and 18, respectively. Due to the above configuration, the granular material H is conveyed within the conveying path 12 while being pushed by the main face of the flights 14 that move along the conveying direction A1.

Preferable examples of the material of the casing 11 include rolled steel material for ordinary structures (SS), stainless steel (SUS), and the like. Preferable examples of the material of the flights 14 include rolled steel material for ordinary structures (SS), stainless steel (SUS), and the like. Preferable examples of the material of the endless chains 15 include rolled steel material for ordinary structures (SS), stainless steel (SUS), chromium molybdenum steel (SCM), and the like.

The control unit 30 controls a driving mechanism such as an unshown motor to rotationally drive the sprockets 17 and 18. As a result, the endless chains 15 wound around the sprockets 17 and 18, and thus the flights 14, circulate within the conveying path 12 along the conveying direction A1. Note that a configuration can be adopted in which driving force is directly applied from the driving mechanism to both of the sprockets 17 and 18, or a configuration can be adopted in which one of those sprockets serves as a main driving sprocket and the other serves as a driven sprocket, such that driving force is applied to only one of the sprockets 17 and 18.

Also, the conveyor 1 has an opening/closing mechanism 16 in the vicinity of the discharge port S2. The opening/closing mechanism 16 is a mechanism for opening/closing the discharge port S2, and in the present embodiment, is an electric valve disposed below the discharge port S2. The control unit 30 can control operation of the flights 14 as described above, and can also control operation of the opening/closing mechanism 16. Specifically, the opening/closing mechanism 16 is controlled by the control unit 30 to transition between an open state and a closed state. The open state referred to here is a state in which the discharge port S2 is most open, and the closed state referred to here is a state in which the discharge port S2 is closed to a greater degree than in the open state. In the closed state, the discharge port S2 is completely or partially closed, and the granular material H cannot pass through the discharge port S2, or the amount of the granular material H that can pass through the discharge port S2 is reduced in comparison to the open state, such that supply of the granular material H to the downstream device 3 is restricted. In other words, supply of the granular material H to the downstream device 3 is stopped, or the amount of the granular material H to supply is reduced.

3. Granular Material Conveying Process

Figure 3:
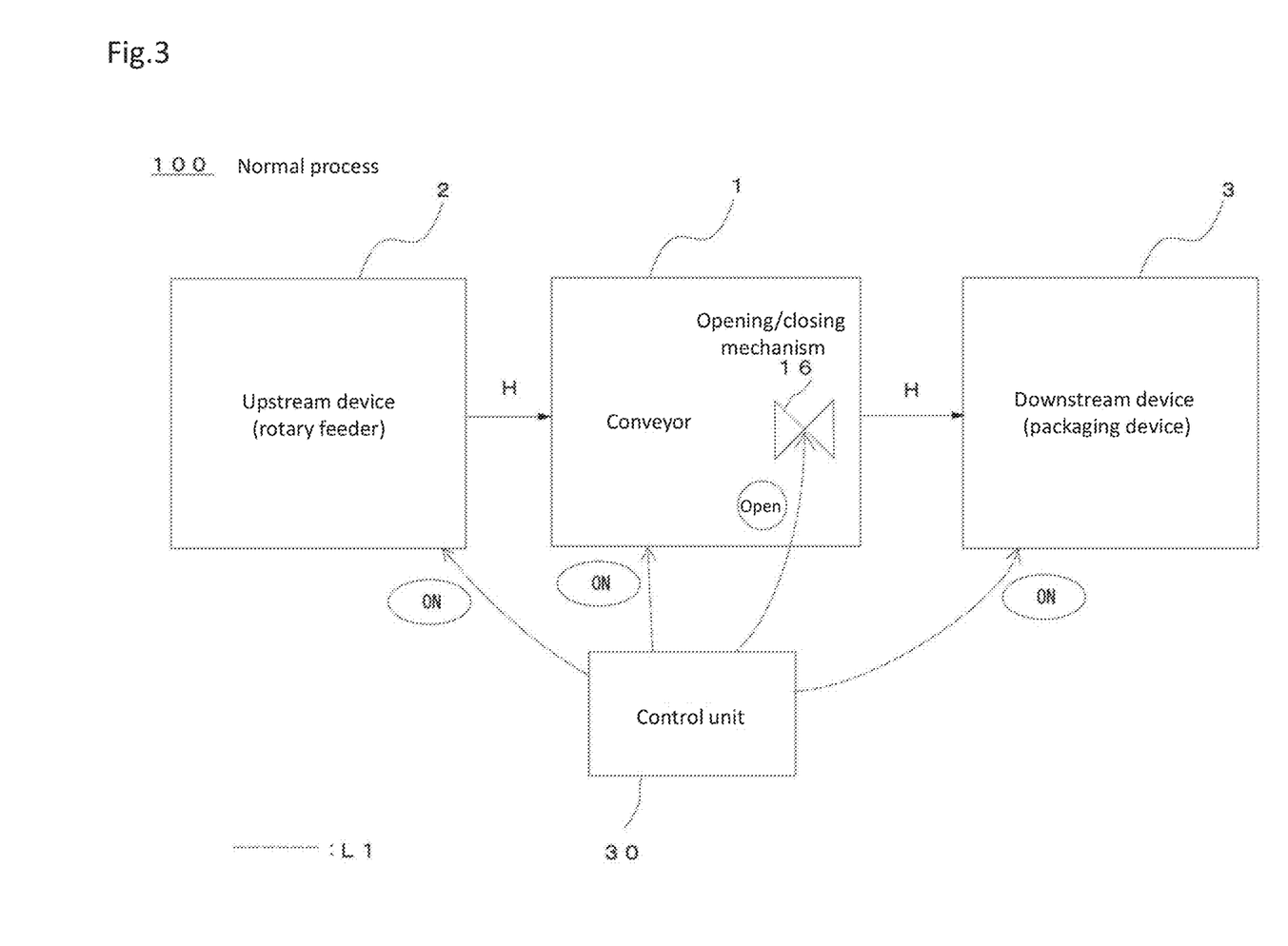
FIG. 3 illustrates an operational state of the production line system in a normal process.
Figure 4:
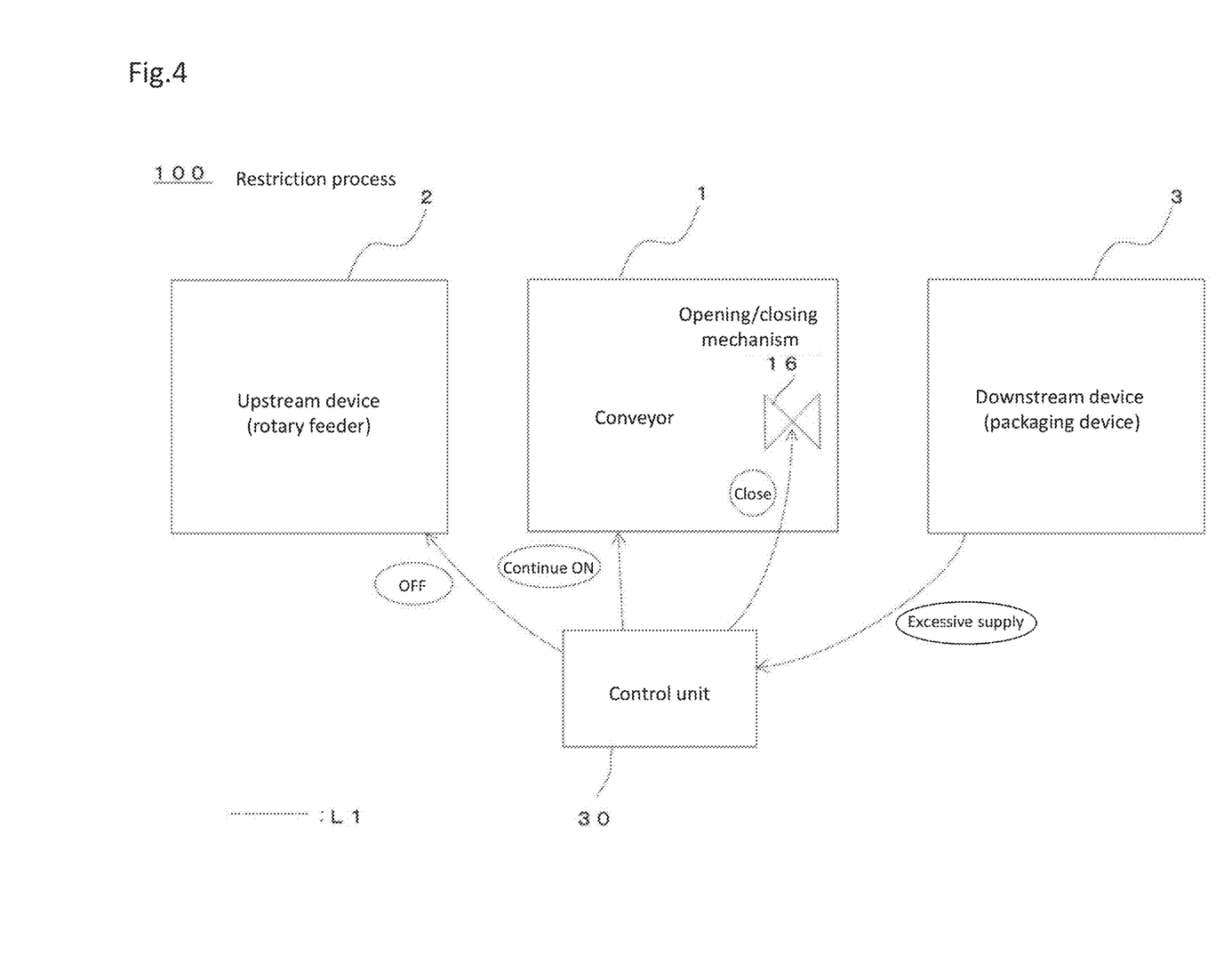
FIG. 4 illustrates an operational state of the production line system in a restriction process.

Next is a description of the process of conveying the granular material H according to the present embodiment, with reference to FIGS. 2, 3, and 4. The conveying process includes a normal process, and a process of restricting supply of the granular material H from the conveyor 1 to the downstream device 3 (referred to below as a restriction process). This conveying process is described in order below.

FIG. 3 illustrates the operational state of the production line system 100 in the normal process. In the normal process, the control unit 30 controls the upstream device 2 such that the granular material H is continuously or intermittently introduced to the supply port S1 of the conveyor 1. The granular material H successively supplied to the conveyor 1 in this manner is successively conveyed within the forward path 12*a* by the flights 14. More specifically, the control unit 30 circulates the flights 14 along the conveying path 12 while the upstream device 2 is driving. Also, at this time, the opening/closing mechanism 16 is maintained in the open state by the control unit 30. The granular material H is pushed by the flights 14 that circulate within the conveying path 12, and thus moves in the horizontal direction within the lower portion 11*b* of the casing 11, and then moves upward in the vertical direction within the center portion 11*a*, and furthermore moves in the horizontal direction within the upper portion 11*c*. Afterward, the granular material H that has reached the discharge port S2 drops from the discharge port S2 and is successively supplied to the downstream device 3. The flights 14, which have been emptied by passing by the discharge port S2, are conveyed within the return path 12*b* and return to the supply port S1. Afterward, the flights 14 again receive the granular material H that has been introduced from the supply port S1, and the same operation is repeated. Further, the control unit 30 drives the downstream device 3, and packages the granular material H that has reached the downstream device 3. The process described above is the normal process.

Next is a description of the restriction process. FIG. 4 illustrates the operational state of the production line system 100 in the restriction process. The restriction process is executed when it is determined to be necessary to restrict supply of the granular material H from the conveyor 1 to the downstream device 3. Specifically, the control unit 30 executes the restriction process when, for example, it is not possible for the processing capacity of the downstream device 3 to keep up due to excessive supply of the granular material H and so an overflow is determined to be likely, or when operation of the downstream device 3 is stopped because there is determined to be some abnormality. Under such circumstances, it is preferable to restrict not only operation of the conveyor 1, but also supply of the granular material H from the upstream device 2 to the conveyor 1. Therefore, the control unit 30 restricts not only operation of the conveyor 1 but also operation of the upstream device 2.

When the control unit 30 decides to execute the restriction process, the control unit 30 controls operation of the upstream device 2 through the communications line L1 and restricts supply of the granular material H to the conveyor 1. At this time, supply of the granular material H from the upstream device 2 to the conveyor 1 may be temporarily stopped, or the amount of the granular material H to supply may be reduced. Note that, when reducing the amount of the granular material H to supply, the degree to which that supply amount is reduced is appropriately determined by the control unit 30 according to the circumstances of the downstream device 3.

Similarly, when the control unit 30 decides to execute the restriction process, the control unit 30 controls the opening/closing mechanism 16 to close the discharge port S2 through the communication line L1, thereby establishing the closed state of the opening/closing mechanism 16. At this time, the discharge port S2 may be completely closed, or may be partially closed. Note that "completely closing the discharge port S2" means closing the discharge port S2 to such an extent that the granular material H substantially cannot pass through the discharge port S2. The degree to which the discharge port S2 is closed in the closed state may be predetermined in advance for any circumstance, or may be adjusted according to the circumstances of the downstream device 3. Also, while maintaining the closed state of the opening/closing mechanism 16, the control unit 30 performs control to continue circulation of the flights 14, and thus continue moving the granular material H along the conveying path 12. As a result, the granular material H that has not been discharged from the discharge port S2 because the discharge port S2 is closed is returned to the return path 12b while being carried by the flights 14, and starts circulating through the conveying path 12.

Note that, if circulation of the flights 14 is stopped while maintaining the closed state of the opening/closing mechanism 16, the granular material H within the conveying path 12 drops due to gravity, gaps between particles of the granular material H become clogged and the granular material H becomes dense, and therefore fluidity decreases. At this time, the granular material H is expected to be concentrated particularly at the lower portion 11b of the casing 11 and the lower portion of the center portion 11a. In such a state, when attempting to restart the normal process, the decreased fluidity of the granular material becomes resistance, and there is an excessive load when restarting the flights 14. As a result, parts of the conveyor 1, including the flights 14, may become damaged.

However, in the present embodiment, in the restriction process as well as in the normal process, it is possible to prevent a decrease in the fluidity of the granular material H by continuing to move the granular material H remaining within the casing 11 instead of allowing the granular material H to become stationary. Therefore, even when restarting the normal process, there is not an excessive load when restarting the flights 14, and as a result it is possible to return from the restriction process to the normal process without delay.

Note that the return from the restriction process to the normal process is performed when the control unit 30 has decided to release the restriction process. The control unit 30 decides to release the restriction process when the reason for entering the restriction process is resolved, for example.

When the control unit 30 decides to release the restriction process, the control unit 30 causes the upstream device 2 to execute the normal process through the communications line L1. Similarly, the control unit 30 causes the conveyor 1 to execute the normal process through the communications line L1.

Also, the power required to activate the flights 14 is commonly greater than the power required to continue circulating the flights 14. In this respect, in the present embodiment, circulation of the flights 14 is not stopped even in the restriction process, so stopping and restarting of operation are not repeated unnecessarily. Therefore, from the viewpoint of energy saving, the restriction process is excellent.

4. Variations

Although one embodiment of the present invention is described above, the invention is not limited by the embodiment described above, and various modifications are possible without departing from the gist of the invention. Also, the gist of the variations below can be appropriately combined.

4-1

The conveyor 1 of the above embodiment is configured to convey the granular material H mainly from below to above in the vertical direction, but the conveying direction of the granular material H is not limited to this direction, and for example, the conveyor 1 may be a type of device that conveys the granular material H mainly in the horizontal direction.

4-2

In the above embodiment, the opening/closing mechanism 16 is configured as an electric valve, but the configuration of the opening/closing mechanism 16 is not particularly limited as long as the discharge port S2 can be opened and closed. For example, the opening/closing mechanism 16 can be realized as a hinged door or a sliding door that can open and close the discharge port S2.

4-3

The start conditions of the restriction process are not limited to those described above. For example, a configuration may be adopted in which, for example, when it is not possible for the processing capacity of the downstream device 3 to keep up and so an overflow seems likely, or when operation of the downstream device 3 is stopped because of some abnormality, a restriction command is sent from the downstream device 3 to the control unit 30, and upon receiving the restriction command, the control unit 30 executes the restriction process.

4-4

In the above embodiment, the conveyor 1 is a flight conveyor, but the various operation including the restriction process described above is not limited to a flight conveyor, and is also applicable to another type of conveyor. In particular, in the case of a conveyor having a plurality of conveying units such as flights that apply force to the granular material H by pushing the granular material H during conveyance, or the like, if the above-described sort of restriction process is not implemented, the granular material can become dense when operation of the conveyor is stopped. Accordingly, by implementing the above-described restriction process in such a conveyor, it is possible to restart operation of the conveyor without delay.

LIST OF REFERENCE NUMERALS

100 Production line system
1 Conveyor
2 Upstream device
3 Downstream device
4 Hopper
11 Casing
12 Conveying path
12a Forward path
12b Return path
13 Bottom plate
14 Flight
15 Endless chain
16 Opening/closing mechanism
17 Upstream sprocket
18 Downstream sprocket
30 Control unit
H Granular material
S1 Supply port
S2 Discharge port

The invention claimed is:

1. A conveyor configured to convey a granular material to a downstream device, the conveyor comprising:
    a casing having a conveying path therein and having a supply port for receiving the granular material and a discharge port for discharging the granular material to the downstream device;
    a plurality of conveying units accommodated in the casing and configured to convey the granular material from the supply port to the discharge port by circulating along the conveying path;
    an opening/closing gate configured to open and close the discharge port; and
    a control unit configured to control operation of the plurality of conveying units and the opening/closing gate,
    wherein the conveying path has a forward path extending from the supply port to the discharge port and a return path extending from the discharge port to the supply port so that the conveying path forms a loop-like path, and
    wherein when restricting supply of the granular material to the downstream device, the control unit is configured to control the opening/closing gate to close the discharge port, and continue to circulate the plurality of conveying units so that the plurality of conveying units return along the return path, reach the supply port, move along the forward path and reach the discharge port while holding the granular material, thereby continuing to move the granular material along the conveying path.

2. The conveyor according to claim 1, wherein when restricting supply of the granular material to the downstream device, the control unit is configured to control the opening/closing gate to completely close the discharge port.

3. The conveyor according to claim 1, wherein the plurality of conveying units are configured to move in a vertical direction in at least part of the conveying path.

4. The conveyor according to claim 1, wherein each of the plurality of conveying units is a flight.

5. A conveyance method of conveying a granular material to a downstream device with a conveyor having a supply port for receiving the granular material and a discharge port for discharging the granular material to the downstream device, the conveyance method comprising:
    supplying the granular material to the conveyor through the supply port;
    conveying the granular material from the supply port to the discharge port by causing a plurality of conveying units included in the conveyor to circulate along a conveying path, the conveying path having a forward path extending from the supply port to the discharge port and a return path extending from the discharge port to the supply port wo that the conveying path forms a loop-like path;
    discharging the granular material from the conveyor to the downstream device through the discharge port; and
    when restricting supply of the granular material to the downstream device, closing the discharge port, and continuing to circulate the plurality of conveying units so that the plurality of the conveying units return to the return path, reach at the supply port, return to the forward path, and reach at the discharge port while holding the granular material, thereby continuing to move the granular material along the conveying path.

6. The conveyor according to claim 2, wherein the plurality of conveying units are configured to move in a vertical direction in at least part of the conveying path.

7. The conveyor according to claim 2, wherein each of the plurality of conveying units is a flight.

8. The conveyor according to claim 3, wherein each of the plurality of conveying units is a flight.

* * * * *

UNITED STATES PATENT AND TRADEMARK OFFICE
CERTIFICATE OF CORRECTION

PATENT NO. : 10,745,204 B2
APPLICATION NO. : 16/498265
DATED : August 18, 2020
INVENTOR(S) : Sato et al.

Page 1 of 1

It is certified that error appears in the above-identified patent and that said Letters Patent is hereby corrected as shown below:

In the Specification

In Column 2, Line 2, delete "conveying," and insert --conveying--.

In Column 2, Line 41, delete "conveyor" and insert --conveyor.--.

In Column 2, Line 44, delete "path" and insert --path.--.

In Column 2, Line 47, delete "port" and insert --port.--.

In Column 2, Line 52, delete "path" and insert --path.--.

In Column 3, Line 11, delete "of" and insert --of the--.

In the Claims

In Column 10, Claim 5, Line 17, delete "wo" and insert --so--.

Signed and Sealed this
First Day of March, 2022

Drew Hirshfeld
*Performing the Functions and Duties of the
Under Secretary of Commerce for Intellectual Property and
Director of the United States Patent and Trademark Office*